United States Patent
Chang

(10) Patent No.: US 9,524,419 B2
(45) Date of Patent: Dec. 20, 2016

(54) FACE-DETECTING EXHIBITION DEVICE FOR DISPLAYING INFORMATION OF OBJECT

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 167 days.

(21) Appl. No.: 14/528,043

(22) Filed: Oct. 30, 2014

(65) Prior Publication Data

US 2015/0116210 A1  Apr. 30, 2015

(30) Foreign Application Priority Data

Oct. 31, 2013 (CN) .......................... 2013 1 0527825

(51) Int. Cl.
| | |
|---|---|
| G09G 5/00 | (2006.01) |
| G06K 9/00 | (2006.01) |
| A47F 3/00 | (2006.01) |
| G06F 3/01 | (2006.01) |

(52) U.S. Cl.
CPC ............. *G06K 9/00275* (2013.01); *A47F 3/00* (2013.01); *G06F 3/012* (2013.01)

(58) Field of Classification Search
None
See application file for complete search history.

(56) References Cited

U.S. PATENT DOCUMENTS

| | | | | |
|---|---|---|---|---|
| 7,830,259 | B2* | 11/2010 | Walker .................. | G06Q 10/08 235/385 |
| 2007/0206349 | A1* | 9/2007 | Jacobs .................. | G06F 1/1681 361/679.05 |
| 2011/0255787 | A1* | 10/2011 | Chang ............... | H04M 1/72544 382/190 |
| 2011/0285502 | A1* | 11/2011 | Steinmetz .......... | G06K 7/10227 340/5.61 |

(Continued)

OTHER PUBLICATIONS

Applie iPhone 4S Official Commercial, https://www.youtube.com/watch?v=KxvRvry09Yo, Oct. 4, 2011.*

(Continued)

*Primary Examiner* — Ilana Spar
*Assistant Examiner* — Kirk Hermann
(74) *Attorney, Agent, or Firm* — Zhigang Ma

(57) ABSTRACT

An exhibition device includes a support stage, a display panel, a position sensor, a camera module, a memory, and a processor. The support stage includes a support surface defining a support area for supporting an exhibition object. The position sensor is aligned with the support area. The position sensor detects whether the exhibition object is picked up. The camera module is located on the display panel and orientates toward the support area to capture images in real time. The memory stores basic information and detail information of the exhibition object. The processor analyzes the images to determine whether a face feature exists in the images, and controls the display panel to display the basic information if the sizes of the face feature become bigger, and controls the display panel to display the detail information when the exhibition object is picked up.

9 Claims, 4 Drawing Sheets

(56) References Cited

U.S. PATENT DOCUMENTS

| | | | |
|---|---|---|---|
| 2011/0288938 A1* | 11/2011 | Cook | G06Q 30/0251 705/14.66 |
| 2011/0302026 A1* | 12/2011 | Kanakarajan | G06F 17/3087 705/14.45 |
| 2012/0150619 A1* | 6/2012 | Jacob Sushil | G06Q 30/0207 705/14.39 |
| 2013/0021459 A1* | 1/2013 | Vasilieff | G10L 25/78 348/77 |
| 2013/0342730 A1* | 12/2013 | Lee | H04N 5/23293 348/231.4 |
| 2014/0110484 A1* | 4/2014 | Balachandran | G06K 19/0723 235/439 |

OTHER PUBLICATIONS

Before Apple was cool: Vintage ads reveal the iPhone maker's first forays into advertising, www.dailmail.co.uk/sciencetech/article-2262651/Apple-Vintage-ads-reveal-iPhone-makers-forays-advertising.html, Jan. 15, 2013.*

* cited by examiner

FACE-DETECTING EXHIBITION DEVICE FOR DISPLAYING INFORMATION OF OBJECT

FIELD

The subject matter herein generally relates to exhibition technologies and, particularly, to a exhibition device for showing exhibition objects and providing information about the exhibition objects.

BACKGROUND

In a museum exhibition, product show, or similar environment (usually referred to as an "exhibition"), many visitors may visit any number of displays, exhibits, booths, shows, product areas, and the like (usually referred to as "booths"). At each booth, the visitor may want to know information about exhibition objects which are displayed on the booth. Exhibition devices, such as display panels, brochures, audio and video equipments, etc. are used to provide the visitors with the information about the exhibition objects.

BRIEF DESCRIPTION OF THE DRAWINGS

Implementations of the present technology will now be described, by way of example only, with reference to the attached figures.

DETAILED DESCRIPTION

Figure 1:
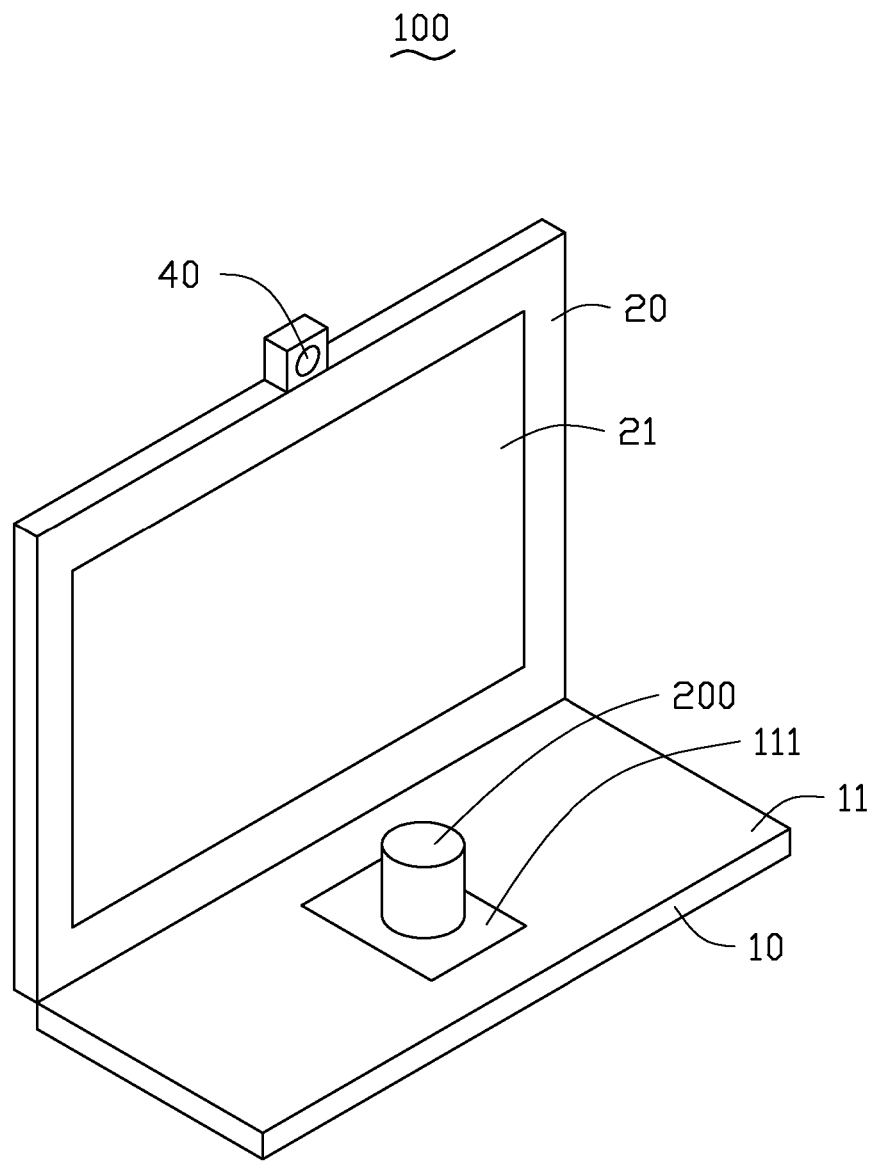
FIG. 1 is an isometric view of a first example embodiment of an exhibition device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially cylindrical means that the object resembles a cylinder, but can have one or more deviations from a true cylinder. The term "comprising," means "including, but not necessarily limited to" and specifically indicates open-ended inclusion or membership in the so-described combination, group, series and the like. The references "a plurality of" and "a number of" mean "at least two."

The present disclosure is described in relation to an exhibition device for showing an exhibition object and providing basic information and detail information about the exhibition object. The exhibition device includes a support stage, a display panel, a position sensor, a camera module, a memory, and a processor. The support stage includes a support surface defining a support area for supporting the exhibition object. The display panel connects to a side of the support stage. The position sensor is located inside the support stage and aligned with the support area. The position sensor detects whether the exhibition object is picked up or not. The camera module is located on the top of the display panel far away the support stage. The camera module orientates toward the support area to capture images including anything in the support area in real time. The memory stores the basic information and the detail information. The processor analyzes the images to determine whether a face feature exists in the images or not, and control the display panel to display the basic information if the size of the face in the latter image is large than the size of the face in the former image, and control the display panel to display the detail information when the exhibition object is detected to be picked up.

Figure 2:
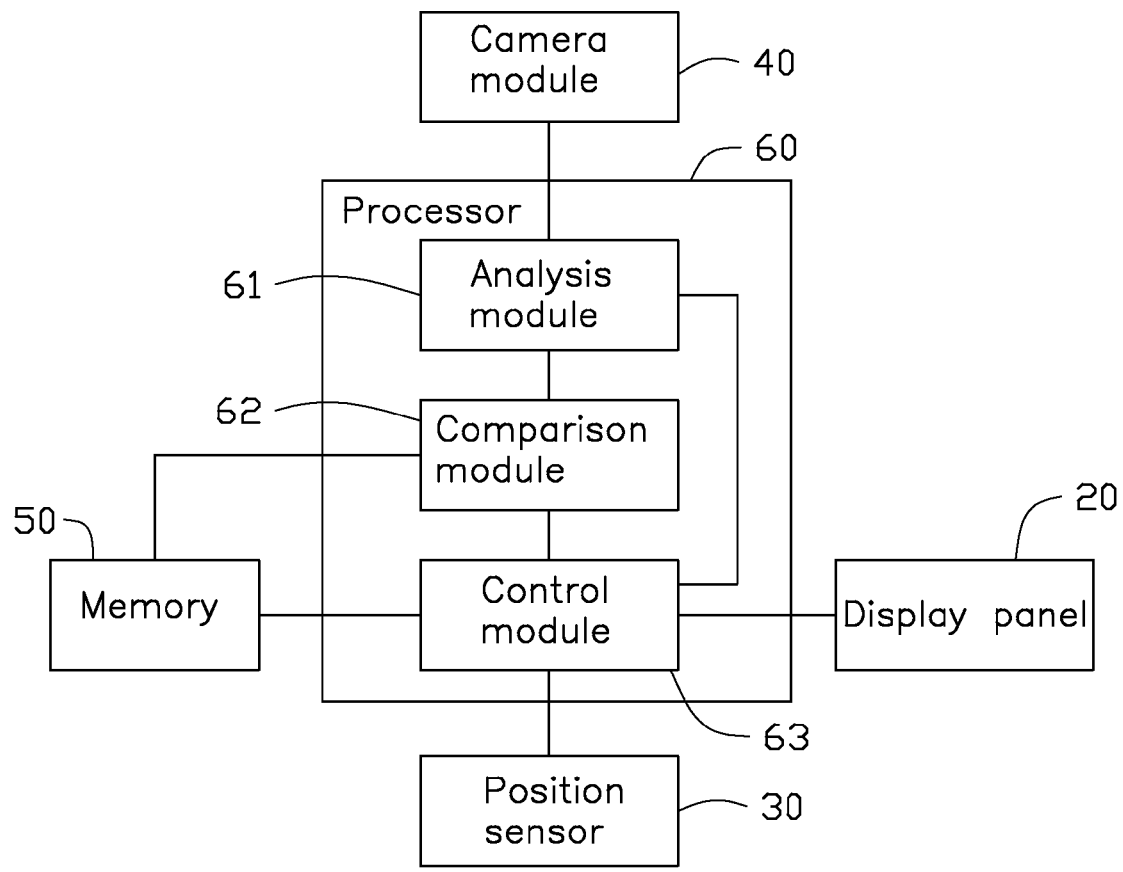
FIG. 2 is a block diagram of the exhibition device of FIG. 1.

FIG. 1 illustrates a first example embodiment of an exhibition device 100. The exhibition device 100 is configured to show an exhibition object 200 and provide information about the exhibition object 200. FIGS. 1 and 2 illustrate that the exhibition device 100 includes a support stage 10, a display panel 20, a position sensor 30, a camera module 40, a memory 50, and a processor 60.

The support stage 10 is substantially cuboid and includes a support surface 11. The support surface 11 defines a support area 111. The exhibition object 200 is positioned on the support surface 11 within the support area 11.

The display panel 20 is connected to a side of the support stage 10 by a hinge (not shown). The display panel 20 can rotate about the hinge with respect to the support stage 10 and can keep in a position like a laptop computer. In this embodiment, the display panel 20 is in a place which is perpendicular to the support stage 10. The display panel 20 defines a display area 21 in a side facing the support stage 10. The display area 21 is configured for displaying information about the exhibition object 200. In one embodiment, the display panel 20 can be liquid crystal display panel.

The position sensor 30 is located inside the support stage 10 and is aligned with the support area 111. The position sensor 30 is configured to detect whether the exhibition object 200 is placed on the support surface 11 within the support area 111 or not. If the exhibition objection 200 is detected to be placed in the support area 111, the position sensor 30 will output a high-level signal. If the exhibition objection 200 is not detected to be placed in the support area 111, the position sensor 30 will output a low-level signal. That is, the position sensor 30 can detect the exhibition object 200 is picked up if the high-level signal is turned into the low-level signal. In one embodiment, the position sensor 30 can be a piezoelectric sensor or a proximity sensor.

The camera module 40 is located on the top of the display panel 20 which is far away the support stage 10. The camera module 40 orientates toward the support area 111 to capture images including anything in the support area 111 in real time.

The memory 50 is located inside the support stage 10 and is configured to store the information about the exhibition object 200 and a quick response code. The information includes basic information and detail information different from the basic information. In detail, the basic information is a brief description of an owner/a company of the exhibition object 200, such as the name, the major product, the technology, the new status of the owner/company, and the like. The detail information is a detail instruction of the structure, the design, the principle, and the related references of the exhibition object 200. The quick response code is about the address information and the contact information of the owner/company, such as email and telephone number.

The processor 60 is located inside the support stage 10 and is electrically connected to display panel 20, the position sensor 30, the camera module 40, and the memory 50. In detail, the processor 60 includes an analysis module 61, a comparison module 62, and a control module 63. The comparison module 62 is directly electrically interconnected between the analysis module 61 and the control module 63, and the control module 63 is directly electrically connected to the analysis module 61. The analysis module 61 is electrically connected to the camera module 40 and is configured to receive images from the camera module 40, and analyze the images to determine whether a face feature exists in the images or not, and output the images each including the face feature to the comparison module 62 if a face feature exists in each of the images. If there is no face feature existing in the images, the analysis module 61 does not output any signal. The comparison module 62 is configured to receive the images each including the face feature from the analysis module 61, and compare sizes of the face feature in different images, and output a first display signal to the control module 63 if the size of the face feature in the latter image is larger than the size of the face feature in the former image and input the image including the face into the memory 50 to be stored. The comparison module 62 is also configured to compare the image including the face feature with the images stored in the memory, and output a count signal to the control module 63. The count signal represents that the mount of the images including the same face feature. The control module 63 is also electrically connected to the memory 60 and the display panel 20. The control module 63 is configured to control the display panel 20 to display the basic information stored in the memory 50 in response to the first display signal, and control the display panel 20 to display the detail information stored in the memory 50 when the high-level signal is turned into the low-level signal received by the control module 63, and determine whether the visitor who is the owner of the face is the most potential buyer or not according to the count signal and input the determination to the memory 50 to be stored. The analysis module 61 is also configured to analyze the images including the face feature to detect whether the visitor use a communication device (such as, a mobile phone or a PAD) and output a second display signal to the control module 63 if the visitor is detected to use a communication device. The control module 63 is also configured to display the quick response code stored in the memory 50 in response to the second display signal. The basic information, the detail information, and the quick response code are displayed on the display area 21.

When the exhibition object 200 is placed on the support surface 11 within the support area 111, the position sensor 30 outputs a high-level signal to the control module 63. The camera module 40 captures images including anything in the support area 111 in real time. The analysis module 61 analyzes the images to determine whether a face feature exists in the images or not, and output the images each including the face feature to the comparison module 62 if a face feature exists in each of the images. The comparison module 62 compares the sizes of the face feature in different images, and output a first display signal to the control module 63 if the size of the face feature in the latter image is larger than the size of the face feature in the former image and input the image including the face feature input to the memory 50 to be stored. The comparison module 62 also compares the image including the face feature with the images stored in the memory 50, and outputs a count signal to the control module 63. The control module 63 controls the display panel 20 to display the basic information stored in the memory 50 in response to the first display signal, and determines whether the visitor who is the owner of the face is the most potential buyer or not according to the count signal and inputs the determination to the memory 50 to be stored.

When the visitor pick up the exhibition object 200 from the support surface 11, the position sensor 30 outputs a low-level signal to the control module 63. The control module 63 controls the display panel 20 to display the detail information stored in the memory 50 when the high-level signal is turned into the low-level signal.

The analysis module 61 analyzes the images including the face feature to detect whether the visitor use a communication device (such as, a mobile phone or a PAD) and outputs a second display signal to the control module 63 if the visitor is detected to use a communication device. The control module 63 displays the quick response code stored in the memory 50 in response to the second display signal.

Figure 3:
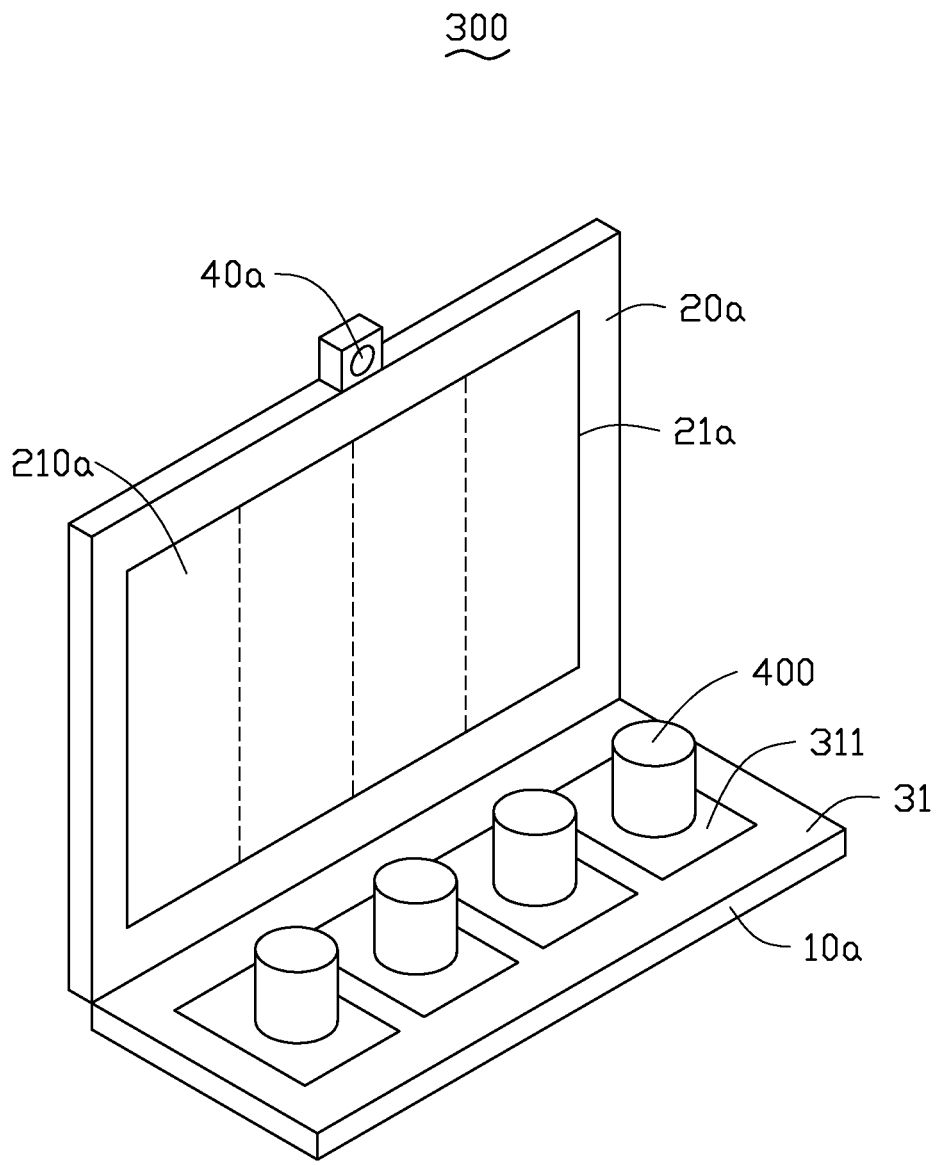
FIG. 3 is an isometric view of a second example embodiment of an exhibition device.
Figure 4:
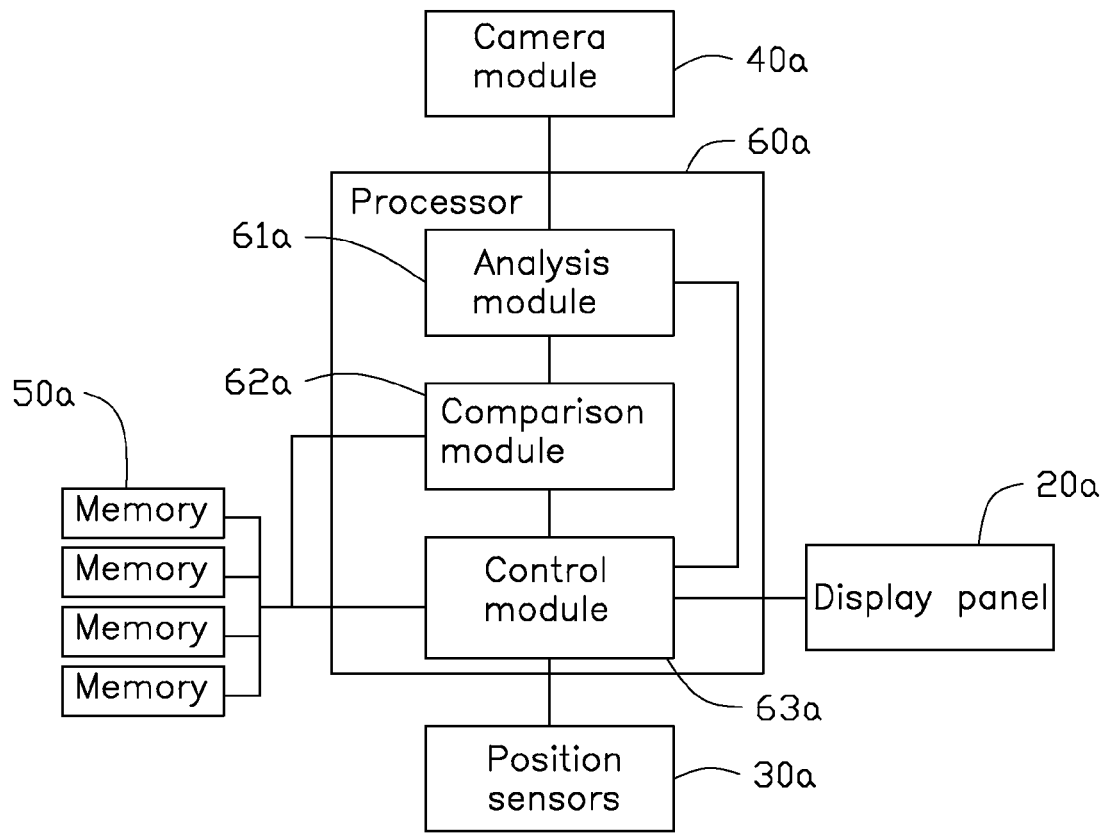
FIG. 4 is a block diagram of the exhibition device of FIG. 2.

FIGS. 3-4 illustrates a second example embodiment of an exhibition device 300. The differences between the exhibition device 300 of the embodiment and the exhibition device 100 of the first embodiment are: the support surface 31 defines a plurality of support areas 311 such that the exhibition device 300 is configured to show a plurality of exhibition objects 400 and provide information about the exhibition objects 400. The exhibition device 300 includes a plurality of position sensors 30a corresponding to the plurality of support areas 311 and a plurality of memories 50a corresponding to the plurality of exhibition objects 400. The display area 21a defines a plurality of sub-areas 210a corresponding to the plurality of exhibition objections 400. Each of the position sensors 30a is located inside the support stage 10a and is aligned with the corresponding support area 311. The exhibition objects 400 are positioned on the respective support areas 311. Each position sensor 30a is configured to detect whether the corresponding exhibition object 400 is placed on the support surface 31 within the support area 311 or not. If the corresponding exhibition objection 400 is detected to be placed in the corresponding support area 311, the position sensor 30a will output a high-level signal to the control module 63a. If the corresponding exhibition objection 400 is not detected to be placed in the corresponding support area 311, the position sensor 30a will output a low-level signal to the control module 63a. That is, the position sensor 30a can detect the exhibition object 400 is picked up if the high-level signal is turned into the low-level signal. The camera module 40a orientates toward the support areas 311 to capture images including anything in the support areas 311 in real time. The memories 50a correspond to the exhibition objects 400 one-to-one.

When the exhibition objects 400 are placed on the respective support areas 311, each position sensor 30a outputs a high-level signal to the control module 63a. The camera module 40a captures images including anything in the support areas 311 in real time. The analysis module 61a analyzes the images to determine whether a face feature exists in the images or not, and outputs the images each including the face feature to the comparison module 62a if a face feature exists in each of the images. The comparison module 62a compares the sizes of the face feature in different images, and outputs a first display signal to the control module 63a if the size of the face feature in the latter image is larger than the size of the face feature in the former image. The control module 63a controls the display panel 20a to display the basic information of exhibition objects 400 stored in the corresponding memories 50a in response to the first display signal. In particular, the basic information of each exhibition object 400 is displayed on the corresponding sub-areas 210a.

When the visitor pick up one of the exhibition objects 400 from the corresponding support surface 311, the corresponding position sensor 30a outputs a low-level signal to the control module 63a. The control module 63a controls the display panel 20a to display the detail information stored in the corresponding memory 50a when the high-level signal is turned into the low-level signal. In particular, the detail information of each exhibition object 400 is displayed on the corresponding sub-areas 210a.

The analysis module 61a analyzes the images including the face feature to detect whether the visitor use a communication device (such as, a mobile phone or a PAD) and outputs a second display signal to the control module 63a if the visitor is detected to use a communication device. The control module 63a displays the quick response codes stored in the memories 50 in response to the second display signal. In particular, the quick response code of each exhibition object 400 is displayed on the corresponding sub-areas 210a.

The embodiments shown and described above are only examples. Many details are often found in the art such as the other features of an exhibition device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An exhibition device configured to show an exhibition object, the exhibition device comprising: a support stage comprising a support surface, the support surface defining a support area for supporting the exhibition object; a display panel connecting to a side of the support stage; a position sensor located inside the support stage and aligned with the support area, the position sensor configured to detect whether the exhibition object is picked up; a camera module located on top of the display panel, the camera module configured to be oriented toward the support area to capture images in real time, the images including a former image and a latter image; a memory configured to store basic information and detailed information about the exhibition object: and a processor configured to: analyze the images to determine whether the images depict a face feature; control the display panel to display the basic information about the exhibition object if a size of the face feature in the latter image is larger than a size of the face feature in the former image; and control the display panel to display the detail information about the exhibition object when the exhibition object is detected to be picked up; wherein the position sensor is configured to detect whether the exhibition object is placed on the support surface within the support area or not, if the exhibition object is detected to be placed in the support area, the position sensor will output a high-level signal, if the exhibition object is not detected to be placed in the support area, the position sensor will output a low-level signal, and the exhibition object is detected to be picked up if the high-level signal is turned into the low-level signal; wherein the processor comprises an analysis module, a comparison module, and a control module, the comparison module is electrically interconnected between the analysis module and the control module, the control module is electrically connected to the analysis module, the analysis module is electrically connected to the camera module and is configured to analyze the images to determine whether a face feature exists in the images or not, the comparison module is configured to receive the images each including the face feature from the analysis module, to compare the size of the faces in different images, and to output a first display signal to the control module if the size of the face in the latter image is larger than the size of the face in the former image, the control module is configured to control the display panel to display the basic information in response to the first display signal, and to control the display panel to display the detail information when the high-level signal is turned into the low-level signal.

2. The exhibition device of claim 1, wherein the comparison module is configured to input the image including the face into the memory to be stored, and to compare the image including the face feature with the images stored in the memory, and to output a count signal representing that the amount of the images including the same face to the control module, the control module is also electrically connected to the memory and the display panel, the control module is also configured to determine whether the visitor who is the owner of the face is the most potential buyer or not according to the count signal and to input the determination to the memory to be stored.

3. The exhibition device of claim 1, wherein the memory is further configured to store quick response code about the exhibition object, the analysis module is also configured to analyze the images including the face feature to detect whether the visitor uses a communication device or not to output a second display signal to the control module if the visitor is detected to use a communication device, and the control module is also configured to display a quick response code stored in response to the second display signal.

4. The exhibition device of claim 1, wherein the basic information is a brief description of an owner of the exhibition object.

5. The exhibition device of claim 1, wherein the detail information is a detail instruction of the structure, the design, the principle, and the related references of the exhibition object.

6. The exhibition device of claim 1, wherein the display panel is connected to the support stage by a hinge.

7. The exhibition device of claim 1, wherein the display panel defines a display area to display the basic information and the detail information about the exhibition object.

8. The exhibition device of claim 1, wherein the position sensor is a piezoelectric sensor or a proximity sensor.

9. An exhibition device configured to show an exhibition object, the exhibition device comprising: a support stage comprising a support surface, the support surface defining a support area for supporting the exhibition object; a display panel connecting to a side of the support stage; a position sensor located inside the support stage and aligned with the support area, the position sensor configured to: detect whether the exhibition object is placed on the support surface within the support area or not; and output a high-level signal if the exhibition object is detected to be placed in the support area, the position sensor will, and output a low-level signal if the exhibition object is not detected to be placed in the support area; a camera module located on top of the display panel, the camera module configured to be oriented toward the support area to capture images in real time, the images including a former image and a latter image; a memory configured to store basic information and detailed information about the exhibition object; and a processor configured to: analyze the images to determine whether a face feature exists in the images or not; receive the images each including the face feature and compare sizes of the faces in different images; output a first display signal if the size of the face in the latter image is larger than the size of the face in the former image; control the display panel to display the basic information about the exhibition object in response to the first display signal; and control the display panel to display the detail information about the exhibition object when the high-level signal is turned into the low-level signal.

* * * * *